ன்

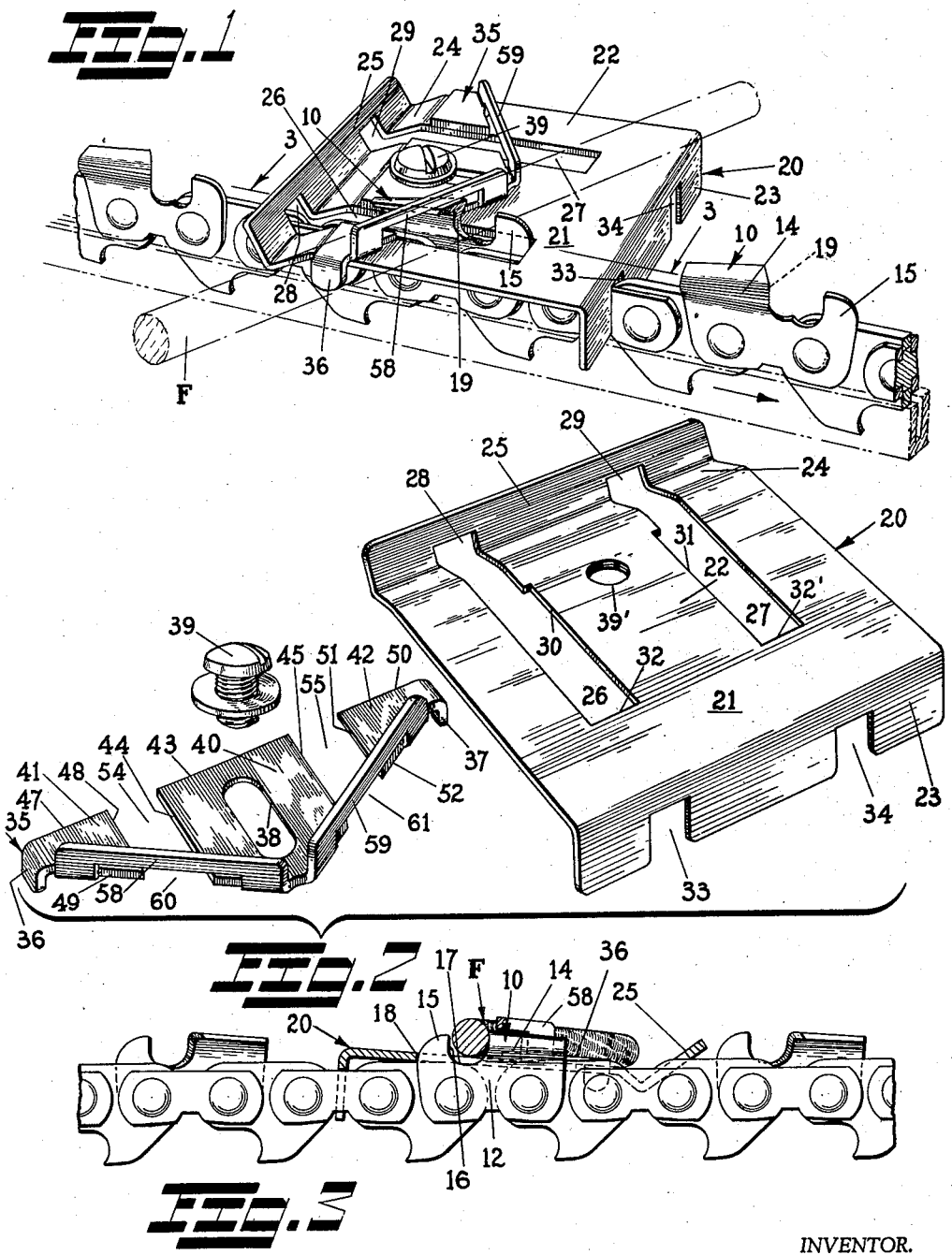

United States Patent Office 2,898,782
Patented Aug. 11, 1959

2,898,782

FILING GUIDE FOR SAW CHAIN TEETH

Paul C. Consoletti, Milford, Mass., assignor to Draper Corporation, Hopedale, Mass., a corporation of Maine Application May 27, 1958, Serial No. 738,115

5 Claims. (Cl. 76—36)

This invention pertains to improvements in saw chain sharpening apparatus and, more particularly, to improvements in filing guides of the type adapted to use in sharpening these saws.

Saw chains of the type herein concerned have cutter or router teeth each integral with a link body which is articulated in a well known manner to the other links of the saw chain. These router links are provided in advance of the forward cutting edge of each router tooth with a depth gauge for limiting the depth of cut in a manner well known to those skilled in the art. Merz U.S. Patents 2,589,015 and 2,632,484 disclose such saw chain so that no further detailed description and explanation thereof need be given here.

The general object of this invention is to provide a filing guide device of the type shown in U.S. Patent 2,737,830 but embodying improvements such that one may file each tooth employing the guide to limit the height and length of the tooth, bevel and rake of the cutting edge and to maintain a very high degree of uniformity in the teeth without resort to other than ordinary skill.

It is a more specific object to provide a filing guide for saw chain teeth in which the file guiding means has a predetermined angular disposition on its supporting member properly to effect sharpening to the correct cutting angle the curved forward cutting edge of similarly shaped router cutting elements or teeth of "right" and "left" configuration.

In the United States Patent 2,737,830, supra, a filing guide for chain saw teeth is shown and described and comprises a metal plate having downwardly bent end walls and a rectangular flat top portion the central portion of which is formed with a longitudinally extending slot of a size to enable free passage upwardly therethrough of an inserted router cutter tooth and wherein downwardly extending end walls have aligned notches opposite the respective ends of the longitudinal slot in the top portion of a width for fitting over the sides of the connecting links proximate to the front and rear end extremities of the inserted cutter tooth required to be sharpened when the filing guide is mounted on the saw chain. In use of such prior devices, however, the angularity of the filing operation is controlled solely by the eye of the filer and thus will vary considerably depending on the experience of the person doing the filing so that non-uniform cutting angles are produced. Again that patented guide leaves to the skill of the filer the amount of material to be removed. Thus uniformity is lacking in this all important aspect. If some teeth are sharpened farther back than others, then they are not of the same height and do not cut to the same depth.

According to the invention, the filing guide of the said patent is improved by providing its flat top portion with two longitudinally extending slots, in symmetry, and admitting for free passage therethrough an inserted router cutter tooth of either left-facing or right-facing as the case may be when the base member is set in place over either of such teeth. Angularly disposed file guiding means are provided on a slide plate which is adjustably fixed to the flat top portion of the base member and such file guiding means serves as an aligning member and a stop to be engaged by a file whereby the file will be angularly disposed at the correct angle to the tooth to be sharpened.

The invention will be described in greater detail by reference to the accompanying figures of drawing, wherein:

Fig. 1 is a perspective view showing a filing guide device according to the invention mounted on a piece of saw chain and illustrating the manner in which a file is used with the guide in the sharpening of a router tooth.

Fig. 2 is an exploded perspective view of the several parts of the file guiding device shown in Fig. 1.

Fig. 3 is a vertical section taken substantially on line 3—3 of Fig. 1 looking in the direction of the arrows, showing, in elevation, the opposite side of the same router tooth being sharpened and the relationship between the height of its top and the diameter of the file.

Referring first to Figs. 1 and 3 of the drawings, the particular type of saw chain cutter or router tooth with which the filing guide device of the present invention is illustrated in use is generally designated by the reference numeral 10 and comprises a plate member or link 12 having a curved router tooth 14 of conventional type. A depth gauge 15 is formed at the forward end of the plate 12, the rear edge 16 of the depth gauge being spaced from the forward edge of the cutter tooth 10 by an arcuate recess 17. The base of the front edge 18 of the depth gauge is vertical and is used as a datum point or locating surface for positioning the cutter tooth 10 in the file guiding device as will hereinafter be described.

The cutter tooth 10 has a curved, sharpened, beveled, forward cutting edge which is indicated at 19 in Fig. 1 while the top edge portion of the tooth is obliquely inclined and slopes rearwardly from the normal direction of travel of the saw chain. The cutter links 14 are articulated to connector links in the saw chain in a known manner.

Now referring to Figs. 1 and 2, the improved filing guide device of the present invention is designated generally by the reference numeral 20 and, as illustrated, comprises a main or base member 21 formed of a metal plate which may be either square or rectangular in shape, made preferably of hardened steel, and having a flat top portion 22 with a depending front wall 23 and an obliquely inclined or downwardly sloping rear wall 24 terminating in an upturned or reflexed end portion 25. The top portion 22 is provided with two longitudinally extending slots or cut-outs 26 and 27 in symmetry with the top portion 22 and each extending therealong through both the sloping rear wall 24 and the lower part of the upturned end portion 25 where their end extremities define the two notches 28 and 29, respectively. As illustrated in Figs. 1 and 2, one side of each slot 26 and 27 is cut out rearwardly from the forward end to an intermediate point as indicated at 30 and 31, respectively, to accommodate "right" and "left" router teeth 10 and to enable a tooth to pass easily through the particular slot when the guide is set in place on the saw chain.

The width of the notches 28 and 29 including the associated end portions of the slots 26 and 27 each are of narrower width than that at the cut-outs 30 and 31 and, preferably, are made to a width slightly greater than the normal width of a saw chain required to be sharpened so as to enable the base plate 21 of the guide device 20 to be easily set in place. When thus mounted on the chain, the rear side portions of the slots 26 or 27 including the upwardly inclined sides of the notches 28 or 29, respectively, will then extend downwardly and embrace with a loose but not sloppy fit the opposite sides of the saw chain links next following the particular tooth 10 received in the filing guide or fixture 20, as depicted in Figs. 1 and 3. Also, at this time the upright front edge of the depth gauge 15 of the inserted router tooth will be engaged against the forward transverse edges 32 or 32' of the respective notches 26 or 27, the said last-named edges functioning as locating or gauge points properly to locate each of the teeth 10 for the sharpening of the same individually to a uniform length.

The front wall 23 of the guide device 20 is provided with two notches 33 and 34 the center lines of which are aligned vertically with those of the notches 28 and 29, respectively, and have substantially the same narrow width as the latter for similarly straddling the chain side links immediately preceding the depth gauge of the particular tooth 10 in the filing fixture. Also, when mounted on the saw chain in the foregoing manner, as shown in Fig. 3, the rear end of plate 21 will be positioned lower than the front end of that plate due to the greater depth of the notch 33 or 34 and thus the top planar part of the guide will slope rearwardly. This rearward slope given to the top portion 22 of the guide device 20 is made to have substantially the same oblique inclination as that of the rearward slope of the top of the working portion 14 of the router tooth 10 so that when filing with the file resting on the top portion 22 of the device 20 and engaged against the guide and stop means presently to be described all teeth will be filed at uniform height and rake, i.e., when using the same and proper file on all teeth all as described in U.S. Patent 2,737,830. It will be understood, of course, that the diameter of the file used will change to suit each particular pitch chain and size of router tooth and that a different base member 21 suited for each pitch size of saw chain will be required.

Now according to the instant invention, adjustably positionable means is provided to be engaged by a file to guide the latter at the proper angle during its longitudinal filing movements. As illustrated in Figs. 1 and 2, this means comprises a slidable member generally designated by the reference numeral 35 having depending lugs 36 and 37 at its flanks or sides and movably arranged on the top portion 22 of the base member 21 of the guide device 20 so as to be adjustably positioned longitudinally thereof. The slide member 35 is centrally slotted as indicated at 38, and is secured in its various adjusted positions by means of a suitable screw 39 which passes through this slot and has threaded connection with a suitably threaded hole 39' in the top portion 22 of the base member 21.

The slide member 35 is of a sectional construction and as shown in Fig. 2, consists of a central metal plate member 40 and two metal end plate members 41 and 42 at either side thereof and transversely spaced therefrom. The central plate member 40 has a straight rear edge 43 and straight side edges 44 and 45 extending forwardly from the rear edge 43 at right angles thereto. The end plate member 41 has a straight rear edge 47, a straight side edge 48 extending forwardly therefrom at right angles thereto, and a forward angularly extending edge 49 inclined at an acute angle, preferably 35°–45°, to the line of the rear edge 47 in the vicinity of the outer side lug 36 of the slide member 35. Similarly, the end plate member 42 has a straight rear edge 50, a straight side edge 51 extending forwardly therefrom at right angles thereto, and a forward angularly extending edge 52 inclined at an acute angle, preferably 35°–45°, to the line of the rear edge 50 adjacent the side lug 37, the edge 52 of the end plate 41 being of opposite inclination to the corresponding edge 49 of the end plate 42. At these plates 40, 41 and 42, as illustrated in Fig. 2, the straight side edges 44 and 45 of central plate member 40 have opposed spaced substantially parallel relationship with the straight side edges 48 and 51, respectively, of the end plate members 41 and 42 to define therebetween the two longitudinal endless openings or open-ended slots 54 and 55, respectively, which are adapted to register with the respective longitudinal slots 26 and 27 in the top portion 22 of the base member 21 of the guide device when the slide member 35 is superposed thereon.

The central plate member 40 and the end plate members 41 and 42 are integrally connected to form a unitary structure of the slide member 35 by two file-guiding projection elements 58 and 59 which are carried by and upstanding on the slide member proximate to the slots 54 and 55, respectively, and disposed angularly at and in correspondence with the angled forward edges 49 and 52, respectively, of the end plate members 41 and 42. The file-guiding projection elements 58 and 59 are disposed in a bridging relation across the slotted openings 54 and 55 and each has one end fixed to the forward edge of the central plate member 40 and its opposite end fixed to the respective forward edge 49 or 52 of the end plate members 41 and 42. The lower portions of these upstanding file-guiding elements 58 and 59 are vertically notched, as indicated at 60 and 61, respectively, these notches being made wide enough to clear the sides of the inserted router tooth 10 and enable it to be inserted therethrough without interference, and further having a depth to bridge and clear the top edge of the working portion 14 of such router tooth.

When the filing guide device 20 has been set in place on a linear run of saw chain and the inserted tooth 10 to be sharpened projects upwardly through the slots 26 and 60, as illustrated in Figs. 1 and 3, a round file F, of proper size and indicated in broken outline, may be inserted into the recess 17 between the depth gauge 15 and the adjacent curved, cutting edge 19 of the router tooth 10 required to be sharpened and moved in filing strokes while limited in movement by the file guiding element 58. With a right-facing tooth 10, the latter would be inserted through the slots 27 and 61 and the file F would engage against the oppositely inclined guiding member 59 to be correspondingly guided thereby.

Of course, the file employed is of correct diameter for the particular saw being sharpened. It is guided horizontally and its height maintained by the top planar surface of plate 21. The angle of filing (35° approximately) is maintained by either guiding surface 58 or 59 depending upon whether a right or left hand tooth is being sharpened. For any immediate condition, this movable guide will be set so that with the guide located with slot end 32 or 32' in contact with a depth gauge, the required amount of material may be removed by filing before the file bears evenly against the vertical guide. In other words, if sharpening requires removal of .005", for example, the guide is set so that the filing action can remove that much material and no more since further cutting action will be barred by the vertical guide. Since the parts are symmetrical about a center line, one setting serves for teeth at both sides.

When properly utilized, each tooth will be sharpened to the same depth, evenly back from its depth gauge, with proper bevel and rake. Normally, filing pressure will keep the guide in its intended position.

It is to be understood that all surfaces are "file hard" so that they are not affected when in action.

The general characteristics of the guide may easily be altered to accommodate saws of varying types and, of course, different sizes are available for chain of the various standard pitches. Actually, very little skill is required and the saw may be sharpened in position on its guide bar so that special holders or supports are not needed. The tool is so compact it may be carried in one's pocket.

While one embodiment of the invention has been disclosed, it is to be understood that the invention concept may be carried out in a number of ways. The invention is, therefore, not to be limited to the precise details described, but is intended to embrace all variations and modifications thereof falling within the spirit of the invention and the scope of the claims.

I claim:

1. In a filing guide for use in the sharpening of saw chain router teeth, a base member having transverse downwardly extending end wall portions adapted to straddle a linear run of saw chain when such base member is mounted thereon, the top portion of said base member being formed with a longitudinally extending slot adapted for free passage therethrough of an inserted router cutter tooth when said base member is set in place over such tooth, and file guiding means movable on the top portion of said base member and to be adjustably positioned longitudinally thereof for limiting the amount of material to be removed from said cutter teeth, said file guiding means including transversely alined projections having predetermined angular disposition.

2. In a filing guide for use in the sharpening of saw chain router teeth, a base plate member having a flat top portion with downwardly extending end wall portions adapted to straddle a linear run of saw chain when such plate member is mounted thereon, said top portion being provided with a longitudinally extending slot adapted for free passage therethrough of an inserted router cutter tooth when said plate member is set in place over such tooth, a slide member movable on said top portion and to be adjustably positioned longitudinally thereof for limiting the amount of material to be removed from said cutter teeth, and file guiding means angularly arranged on said slide member.

3. In a filing guide for use in the sharpening of saw chain router teeth, a base plate member having a generally rectangular flat top portion with downwardly extending transverse end wall portions adapted to straddle a linear run of saw chain when such plate member is mounted thereon, said top portion being provided with two longitudinally extending slots, in symmetry, and alternately adapted for free passage therethrough of an inserted router cutter tooth of either left-facing or right-facing offset disposition on a saw chain when the said base member is set in place over such tooth, a slide member movable on said top portion and to be adjustably positioned longitudinally thereof, means for releasably securing said slide member in any of its adjusted positions, and file guiding means carried by and upstanding on said slide member proximate to each of said slots and disposed angularly at a predetermined angle transversely thereto to be engaged by a file whereby the file will be guided during its filing movements in correct tooth filing position for either a left-facing or a right-facing cutting edge of a router type cutter tooth of a saw chain.

4. A filing guide device for use in the sharpening of saw chain router teeth comprising, in combination, a base member formed of a metal plate having a generally rectangular top portion with a depending transverse end wall at one edge and being provided at the opposite end edge with a downwardly sloping wall portion terminating in an upturned transverse end portion, said top portion of said base member being formed with two longitudinally extending slots, in symmetry, and alternately adapted for free passage therethrough of an inserted router cutter tooth of either left-facing or right-facing offset disposition on a saw chain when the said base member is set in place over such tooth, a slide member having depending side lugs and movable on said top portion of said base member to be adjustably positioned longitudinally thereof, said slide member having a sectional construction composed of a central plate member and two end plate members at either side thereof and transversely spaced therefrom, said central plate member having a straight rear edge and straight side edges extending forwardly therefrom at right angles thereto, each of said end plate members being formed with a straight rear edge and a straight side edge extending forwardly therefrom at right angles thereto and being further provided with a forward angularly extending edge inclined at an acute angle to the line of the rear edge thereof in the vicinity of an outer side lug of said slide member, said straight side edges of said central plate member being in opposed parallel spaced relation to the straight side edge of said adjoining end plate members and defining therebetween two longitudinal endless slots adapted to register with the longitudinal slots in said base member when said slide member is superposed thereon, and two upstanding file guiding projections integrally connecting the said end plates to said central plate member to form a unitary structure of said slide member, said file guiding projections being disposed in bridging relation across the slotted openings defined between said central plate member and said end plate members and being vertically notched to a width corresponding to that of the underlying slotted openings and to a depth to bridge the top edge line of the inserted router tooth, said file guiding projections also being disposed angularly at the forward edges of said central plate member and of the adjoining end flange member at a predetermined angle to be engaged by a file whereby the file will be guided angularly during its filing movements in correct tooth filing position for either a left-facing or a right-facing cutting edge of a router type cutter tooth of a saw chain.

5. A filing guide device for use on a saw chain having a plurality of laterally projecting outwardly curved router cutting elements of "right" and "left" configuration alternately arranged along the saw chain at opposite sides thereof and each of uniform height formed with a rearwardly sloping top edge and provided with a curved forward cutting edge, said guide device including a base member in the form of a metal plate having a rectangular flat top portion with a depending front wall and a downwardly sloping rear wall terminating in an upturned end portion, said top portion being formed with two longitudinally extending slots, in symmetry, each slot being of an overall length to extend from the forward edge limits of the usual depth gauge associated with such router teeth to the rearmost end extremity of the working portion of such router teeth, said slots also being of a width and configuration adapted for free passage therethrough, respectively, of an inserted router cutter tooth of either left-facing or right-facing offset disposition on a saw chain when the said rectangular base member is set in place over such tooth, a slide plate member with flanking guide elements and movably arranged on said top portion of the base member to be adjustably positioned longitudinally thereof, said slide member being of a sectional construction composed of a slotted central plate member flanked by two end plate members in spaced relation to said central plate member to define therebetween two longitudinal slots which are open-ended at the front and rear of the slide member, and have such disposition and dimensional size as to register with the respective longitudinal slots in said base member when the slide member is superposed thereon, and two upstanding file guiding projections integrally connecting the said end plates to said central plate member to form a unitary structure of said slide member, said file guiding projections being disposed in bridging relation across the slotted openings defined between said central plate member and said end plate members and being vertically notched to a width corresponding to that of the underlying slotted openings and to a depth to bridge the top edge line of the inserted router tooth, said file guiding projections also being disposed angularly at the forward edges of said central plate member and of the adjoining end flange member at a predetermined angle to be engaged by a file whereby the file will be guided during its filing movements in correct tooth filing position for either a left-facing or a right-facing cutting edge of a router type cutter tooth of a saw chain.

References Cited in the file of this patent
UNITED STATES PATENTS

| | | |
|---|---|---|
| 2,677,289 | Fitch | May 4, 1954 |
| 2,737,830 | Siverson et al. | Mar. 13, 1956 |
| 2,770,985 | Pearce | Nov. 20, 1956 |
| 2,822,707 | Gommel | Feb. 11, 1958 |